(No Model.)
H. W. HESCOCK.
EVAPORATING PAN.
No. 500,233. Patented June 27, 1893.
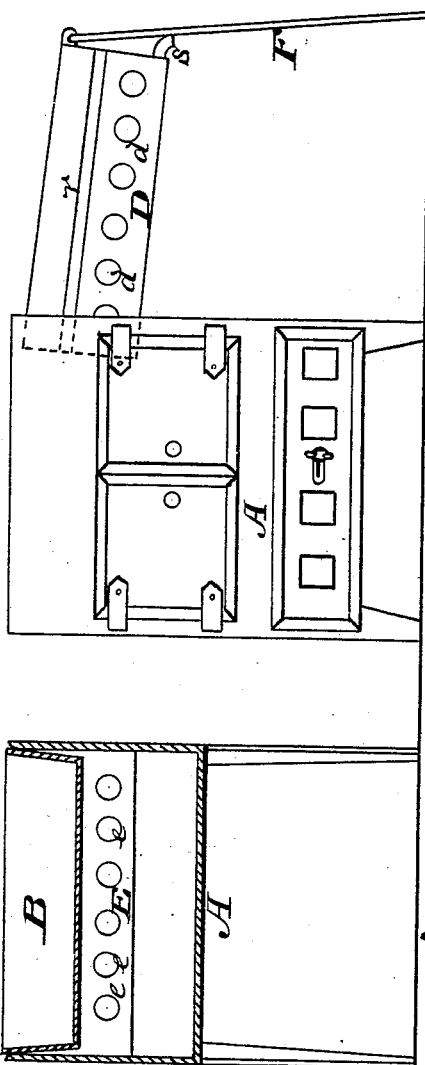
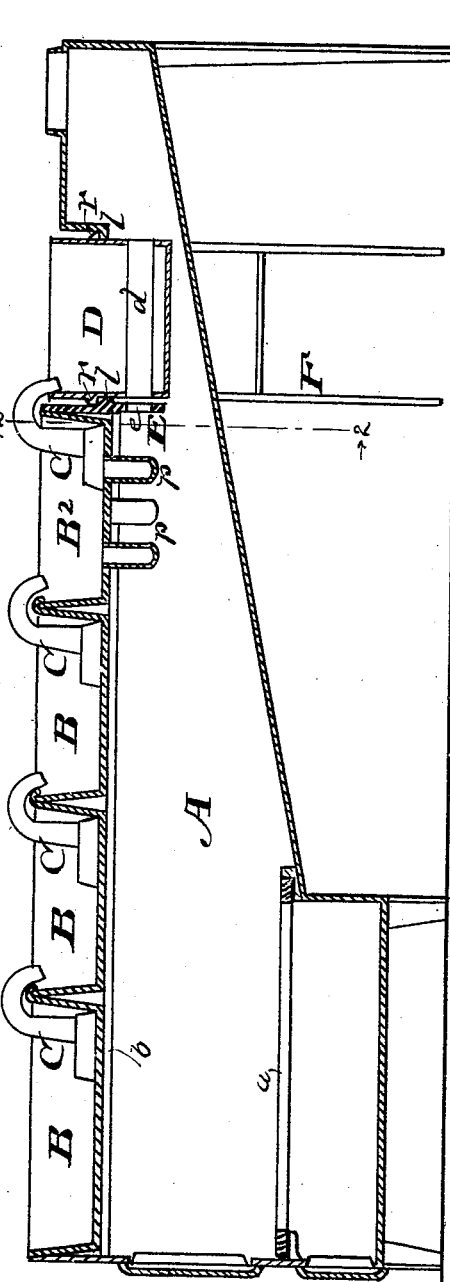
Witnesses,
C. M. Burtturr
E. A. Tibbitts
Inventor,
Henry W. Hescock,
By Geo. W. Tibbitts Atty.
THE NORRIS PETERS CO., PHOTO-LITHO., WASHINGTON, D. C.

UNITED STATES PATENT OFFICE.

HENRY W. HESCOCK, OF HUBBARD, OHIO.

EVAPORATING-PAN.

SPECIFICATION forming part of Letters Patent No. 500,233, dated June 27, 1893.

Application filed September 24, 1892. Serial No. 446,830. (No model.)

*To all whom it may concern:*

Be it known that I, HENRY W. HESCOCK, a citizen of the United States, residing at Hubbard, in the county of Trumbull and State of Ohio, have invented certain new and useful Improvements in Evaporators, of which the following is a specification.

This invention relates to evaporators the nature and objects of which will fully appear in the subjoined description and which are illustrated in the accompanying drawings, in which—

Figure 1 is a longitudinal section of an evaporator embodying my improvements. Fig. 2 is a cross-section on line 2, 2 on Fig. 1 omitting the siphon. Fig. 3 is an end elevation showing the rear pan drawn out and tilted for emptying.

A represents the body of the evaporator provided with fire grate $a$ and other usual appurtenances.

B are evaporating pans removably supported on ledges $b$ provided in the sides of the body A.

C are siphons for conveying the liquid from pan to pan.

To the bottom of pan $B^2$ are attached depending pockets, $p, p$, designed for facilitating the boiling of the liquid therein.

E is a depending partition having a number of holes, $e, e$, and is designed for retarding the passage of heat and flames.

D is the rear and last pan in which the boiling of the sirup is finished, is made much deeper than the forward pans, and is set transversely in the body of the furnace, to enable it to be slid outward at the sides. Through the lower portion of it are provided a number of flues $d, d$, on the same level and corresponding with the holes $e$ in the partition E. These flues are designed for augmenting the boiling effect in said pan. On the sides of said pan are provided ribs $r$ by which the pan is supported on ledges, $l, l$, so that the pan may be moved transversely for adjusting the flues $d$ in their relation with the holes $e$, thereby serving as a damper for graduating the supply of heat in and through said flues.

F is a support pivotally attached to the pan D for supporting it when drawn out as seen in Fig. 3, the pan being provided with a discharge spout S for withdrawing the sirup.

The manner of using this apparatus is as follows: The sap is first put into pans directly over the furnace fire and as the boiling progresses the liquid is transferred to other pans successively and finally to the pan D where the boiling of the sirup is finished. The heat applied to said pan is regulated by shifting the pan transversely to wholly or partially close the passage into its flues as may be required. When the sirup has boiled sufficiently the pan D may be drawn out and supported in a tilted position and the sirup drawn off through the discharge spout.

Having described my invention, I claim as follows:

1. In an evaporator, the combination with a source of heat, a series of connected pans arranged above said source and extending toward the exhaust flue, the last pan of the series having depending pockets, and a depending partition in rear of said pockets having holes through its body; of a finishing pan deeper than the last of the series and to which it delivers, horizontal flues through said finishing pan adapted to be aligned with the holes in said partition, and means for permitting the transverse movement of said finishing pan, as and for the purpose set forth.

2. In an evaporator, the combination with a source of heat, a series of connected pans arranged above said source and extending toward the exhaust flue, and a depending partition in rear of said last pan having holes through its body; of a finishing pan deeper than the last of the series and to which it delivers, horizontal flues through said finishing pan adapted to be aligned with the holes in said partition, ribs on the sides of this pan, ledges upon which said ribs rest to permit the pan to be moved transversely, a delivery spout at one end of the pan, and a support pivotally connected with this end thereof, as and for the purpose set forth.

3. In an evaporator the combination with body A having a perforated partition E, and transverse ledges $l$ within said body; of pan D having supporting ribs $r$ resting on ledges $l$, and provided with pivoted supporting legs F whereby said pan may be drawn out and supported in a tilted position substantially as and for the purpose set forth.

HENRY W. HESCOCK.

Witnesses:
A. K. KIMMEL,
GEORGE GREER.